Oct. 22, 1940.         F. E. STAATS                    2,218,558
                HYDRAULIC TRANSMISSION MECHANISM
                     Filed Dec. 1, 1939               2 Sheets-Sheet 1
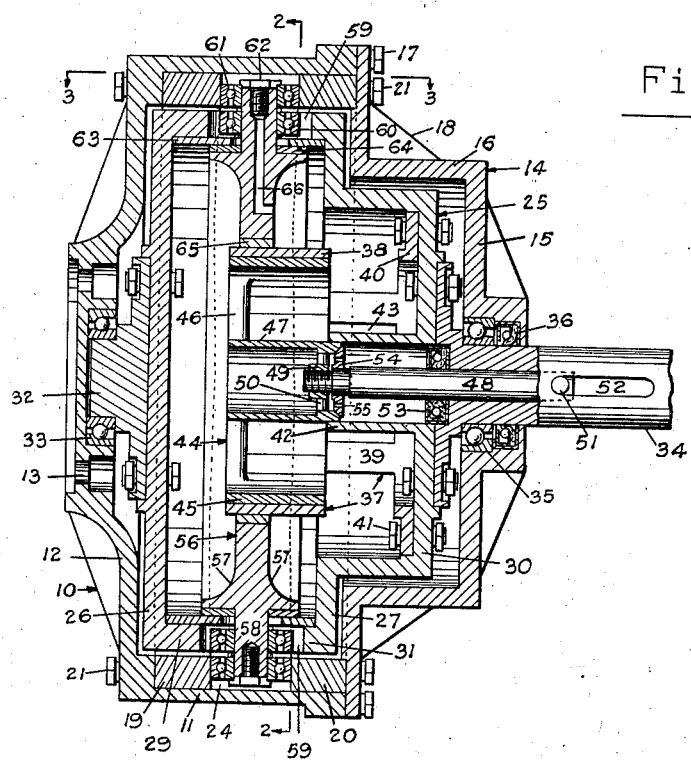
Fig-1-
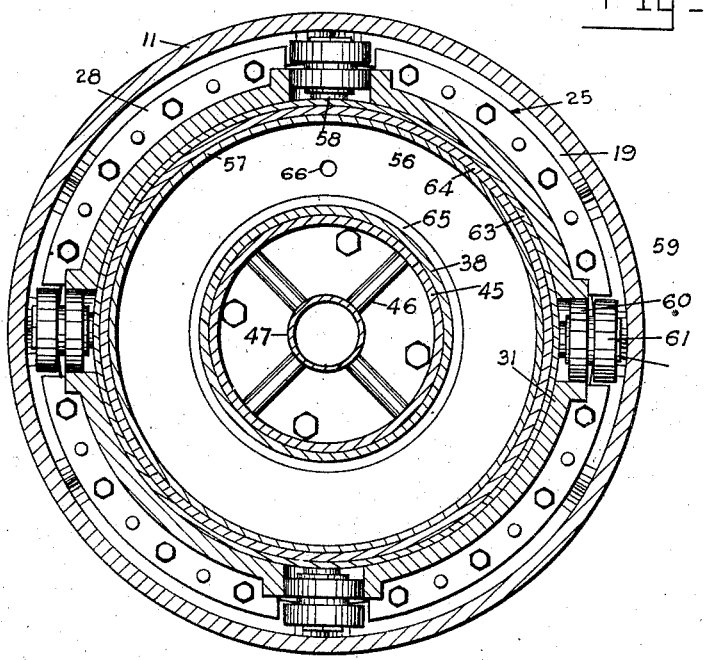
Fig-2-
Inventor
Franklin E. Staats
By
Attorneys Oct. 22, 1940.   F. E. STAATS   2,218,558
HYDRAULIC TRANSMISSION MECHANISM
Filed Dec. 1, 1939   2 Sheets-Sheet 2
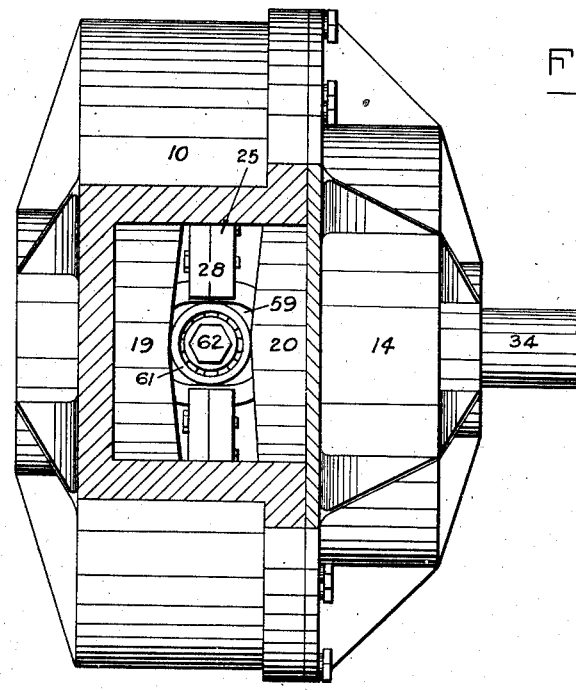
Fig-3-
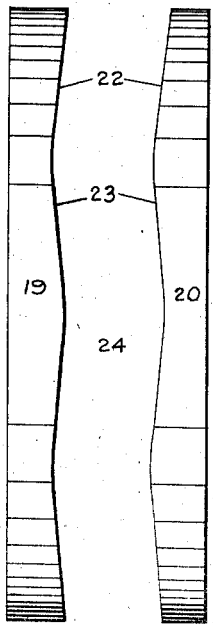
Fig-4-
Inventor
Franklin E. Staats
By: Kessenich and McHugh
Attorneys Patented Oct. 22, 1940

2,218,558

UNITED STATES PATENT OFFICE 2,218,558

HYDRAULIC TRANSMISSION MECHANISM

Franklin E. Staats, Rock Island, Ill.

Application December 1, 1939, Serial No. 307,148

14 Claims. (Cl. 192—59)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a hydraulic transmission mechanism for transmitting power from a driving member to a driven member through variable speed ratios, and relates more particularly to such a mechanism for use with automotive vehicles, transmission brakes, hydraulic pumps and shock absorbers.

The principal feature of the invention consists in the novel construction and arrangement of parts, whereby a rotatable driving member is connected with a piston reciprocable axially of the driving member within a cylindrical driven rotor member, and a fluid medium is provided within the cylindrical driven member for controlling the reciprocation of the piston and therethrough the driving ratio between the driving and driven members.

The specific nature of the invention as well as other objects and advantages thereof will clearly appear from a description of a preferred embodiment as shown in the accompanying drawings in which:

Fig. 1 is a longitudinal section of the transmission mechanism of this invention.

Fig. 2 is a transverse section taken on the line 2—2 of Fig. 1.

Fig. 3 is a section taken on the line 3—3 of Fig. 1.

Fig. 4 is a view in side elevation of the cam rings.

Referring now to the drawings by characters of reference there is shown in longitudinal section in Fig. 1 a cup shaped member 10 comprising the annular wall portion 11 joined at one end to an end plate 12 which may be integral with the annular wall portion 11 or otherwise suitably secured thereto in fluid sealed relation. Conveniently, when the transmission mechanism is to be used for the transmission of power in an automotive vehicle, the cup shaped member 10 may be comprised as an element of a hollow fly wheel and is secured to the crank shaft or other driving element of a prime mover through its end plate 12 by suitable fastening means inserted through the bores 13 in the end plate in fluid sealed relation for such purpose. At its end opposed to the end plate 12 the member 10 is closed by a removable end plate 14 formed with an outwardly dished portion 15 having the annular wall portion 16 concentric with the longitudinal axis of member 10. The end plate 14 is secured to the annular wall portion 11 of member 10 by removable fastening means 17 in such manner as to form a fluid tight joint, and as is well understood in the art the end plates 12 and 14 may be suitably reinforced as by the reinforcing fins generally indicated at 18.

For a purpose more specifically related in detail hereinafter a pair of cam rings 19 and 20 are disposed within the cup shaped member 10 adjacent either end portion of the annular wall portion 11 and in abutting relation with the end plates 12 and 14 respectively. The rings 19 and 20 are of such diameter as to fit snugly within the wall portion 11 and are secured to the end plates against which they abut by removable fastening devices 21. As shown more particularly in Fig. 4, the confronting edges 22 of the cam rings 19 and 20 are formed to provide spaced opposed parallel cam surfaces 23 of substantially equal length circumferentially of the rings and with adjacent opposed surfaces equally and oppositely inclined axially of the longitudinal axis of member 10 to define the axially undulating endless cam way or groove 24. While the cam rings 19 and 20 have been shown as continuous ring elements it will of course be understood, that they may be comprised of discrete arcuate segments assembled in ring form.

Within the fly-wheel comprised of the cup shaped member 10 and end plate 14 is disposed a hollow rotor 25 mounted for rotation relative to the fly-wheel. As shown in Figs. 1 and 2 the rotor 25 is comprised of a front housing member 26 and rear housing member 27 joined by the coupling flanges 28 (see Fig. 2) in any desirable manner. The housing member 26 is a cup shaped member similar in section to the member 10 and formed with an annular wall portion 29 terminating in the coupling flange 28. Likewise the housing member 27 has a dished portion 30 similar to the dished portion 15 of the end plate 14 and an annular wall portion 31, of substantially the same diameter as wall portion 29, terminating in the coupling flange 28 for coaction with the flange 28 on member 26 in securing the two housing members into the rotor assembly. At its front end the rotor 25 is provided with a journal member 32 secured to the housing member 26 axially thereof and suitably journaled, as by the frictionless bearing 33 in member 10, axially of the fly wheel. The rear end of the rotor is supported for rotation by the driven shaft 34 journaled in the end plate 14 axially of the fly wheel as by the frictionless bearing 35, and suitably secured to the dished portion 30 of housing member 27 axially of the rotor. To prevent escape of fluid within the fly wheel through the bore in end plate 14 in which driven shaft 34 is located a seal 36 may be interposed between the bearing 35 and adjacent portion of the end plate in fluid sealed relation with the shaft and end plate.

A valve cage 37 formed with a cylindrical tubular valve guide portion 38 joined by circumferentially disposed substantially equi-spaced supporting struts 39 to an annular base 40 is secured by its base to the end wall of the dished portion 30 of the rotor housing member 27 within the rotor axially thereof by any suitable fastening means, such as indicated at 41, and the end wall portion of the dished portion 30 is provided with an inwardly extending axially disposed tubular projection or sleeve 42 lying within and substantially spaced from the struts 39. As shown more particularly in Fig. 1 the struts 39 are so spaced as to form valve ports 43 therebetween, and the interior diameters of the cylindrical tubular valve guide portion 38, spacing of the struts 39 and annular base portion 40 is the same whereby the interior surfaces of these elements may serve as bearing surfaces for a reciprocable valve 44.

The valve 44 comprises a cylindrical tubular element 45 fitted within the valve guide portion 38 of the valve cage for reciprocation therewithin and is joined by the spokes 46 at its forward end to the forward end of an axially disposed cylindrical tubular member 47 having a sliding fit within the tubular projection or sleeve 42. In the fully uncovered position of the valve ports 43 the ends of valve element 45 register with the ends of valve cage portion 38 and the member 47 is overlapped with the sleeve 42. The valve 44 is adapted to be reciprocated within the valve cage 37 between full port uncovering position in registration with the element 38 of the cage and full port closing position with the valve element spanning the interior of the base 40 and element 38 of the valve cage in fluid sealed relation to the valve ports 43. For reciprocating the valve 44 a valve shaft 48 secured to a hub 49 fastened by spokes 50, in the rear end portion of tubular member 47 is provided. The shaft 48 is conveniently slidably mounted within an axial bore of the driven shaft 34 and is keyed for rotation therewith by means of a pin 51 secured to the valve shaft and protruding through opposed longitudinal slots 52 in the driven shaft. The valve shaft 48 may be reciprocated by any conventional type of throw out collar, yoke and actuating arm or pedal, with the collar suitably connected with the pin 51 and the actuating arm biased to normally retain the valve shaft 48 in its rearwardmost position with the valve element 45 fully closing the ports 43. As the valve shaft actuating means forms no part of the present invention and is conventional in the art it has been omitted for the sake of clarity.

An oil or other fluid seal 53 is interposed between the valve shaft 48 and driven shaft 34 to prevent escape of oil without the rotor 25.

To prevent the transmission mechanism from grabbing when the valve is released from its port uncovering position as shown in Fig. 1 to be returned to its normal port closing position by the bias on the actuating arm or pedal as above explained, a safety valve 54 is slidably mounted on a reduced portion of the valve shaft 48 and is adapted to seat upon the adjacent end of the tubular member 47 in sealed relation. The valve 54 is formed with apertures 55 to form throttling passages and in this manner a dash pot effect is obtained permitting gradual movement of the valve to its normal port covering position or throttling position of the ports 43. When the valve shaft 48 is moved forwardly the valve 54 may slide on the reduced portion of the shaft to provide a free passage leading from the member 47 to sleeve 42, through the annular space between the periphery of the valve and interior of the sleeve 42.

An annular piston 56 having outwardly directed peripheral flanges 57 and a plurality of circumferentially spaced radial extending trunnions 58 is reciprocally mounted within the rotor 25 axially thereof. The trunnions 58 are equi-spaced circumferentially of the piston and are protruded through axially elongated openings 59 in the annular wall portions 29 and 31 of the rotor housing members 26 and 27, respectively, and as clearly shown in Fig. 1 the trunnions are disposed within the cam groove 24. Frictionless bearings 60 are suitably mounted on the trunnions 58 for bearing on the side walls defining the slots 59 to guide the piston in reciprocable motion and to prevent relative rotative movement of the piston with respect to the rotor. Frictionless bearings 61 similar to the bearings 60 are secured on the trunnions 58, as by the cap screws 62, for engagement with the confronting cam surfaces 23 in the cam rings, whereby rotary movement of the fly wheel and cam groove 24 will reciprocate the trunnions 58 and piston 56 axially of the rotor. In order to ensure that there will be no loss of fluid medium from the interior of the rotor 25 through the trunnion openings 59 cooperating annular sleeves 63 and 64 are disposed on the annular wall portions 29 and 31 of the rotor housing members 26 and 27 and flanged portions 57 of the piston 56 respectively. The inner peripheral edge of the piston 56 is provided with a sleeve 65 which engages the cylindrical member 38 of the valve cage in sliding snugly fitting relation.

A fluid medium of any desirable characteristic may be introduced within rotor 25 through a suitable filling opening 66 extending through a trunnion 58 and the piston 56 which is normally closed by the cap screw 62 accessible through a suitable fluid sealed opening in the fly wheel member 10.

In operation the rotor 25 is filled with a suitable fluid medium, such as oil, and the cap screw 62 closing filling opening 66 put in place. The fly wheel casing is then filled with oil which serves as a lubricant for the bearings 33, 35, 60, 61 and cam faces 23 and in addition acts as a seal to prevent any fluid from escaping from the rotor housing 25. The fly wheel which is secured to the driving shaft of a prime mover through the fly wheel member 10 is rotated by the driving shaft, and assuming that the valve 44 is in the position of Fig. 1, rotation of the fly wheel will effect reciprocation of the piston 56 which will force the fluid medium in the rotor back and forth through the ports 43 in the valve cage and inasmuch as the piston meets no appreciable resistance the piston may be freely reciprocated and no rotary movement of the rotor will take place. As the valve is retracted to throttling position of the ports 43 the fluid medium will offer increased resistance to displacement by the piston 26 and free reciprocation of the piston will be impeded, thereby causing the cam groove 24 to rotate the rotor through the trunnions 58 at a predetermined relative rate with respect to the fly wheel. When the valve 44 completely covers the ports 43 circulation of fluid medium from one side of the piston to the other is precluded and displacement of the piston prevented in which case the rotor will be rotated at the same relative speed as the fly wheel. By arranging the valve 44 properly with respect to the ports 43 the speed of the rotor 25 and hence the driven shaft 34 may be regulated in any ratio from zero to the full speed of the fly wheel. As will be clear from inspection of Fig. 1 the oil in rear of safety valve 54 within sleeve 42 will be throttled through the passages 55 as the valve shaft is returned to its normal rearmost position or to a position throttling the ports 43 and such action will cause the valve shaft 48 to be returned gradually and uniformly obviating any grabbing of the transmission mechanism. The valve shaft 48 will be freely movable forwardly from its rearmost position as the safety valve 54 may slide on the reduced portion of the valve shaft to permit unimpeded passage of oil into sleeve 42 through the annular space between valve 55 and the interior of the sleeve 42.

Having now particularly described what is at present considered a preferred embodiment of the invention what I claim and desire to secure by U. S. Letters Patent is:

1. In a variable speed transmission, a driving member formed with an endless cam groove, a hollow driven member adapted to be filled with a fluid medium and having a piston therein operatively engaging said cam groove for reciprocation thereby in a direction longitudinally of the axis of the driven member at a predetermined ratio with respect to the rotation of the driving member upon rotation of the latter, said cam groove being formed so as to rotate the piston and driven member when other than said predetermined ratio exists, and a regulatable valve in the driven member cooperating with the piston to control the displacement of fluid medium from one side of the piston to the other as the piston is reciprocated; whereby the rate of reciprocation of the piston may be controlled to vary the ratio of reciprocation thereof with respect to the rotation of driving member from said predetermined ratio to zero.

2. In a transmission mechanism in combination, a fly wheel, a hollow rotor adapted to be filled with a fluid medium axially mounted within the fly wheel, a piston mounted within the rotor for reciprocation axially of the fly wheel and rotor, means on the fly wheel coacting with the piston to effect reciprocation thereof at a predetermined ratio with respect to rotation of the fly wheel upon rotation of the latter, said means being relatively rotatable with respect to the piston and adapted to effect rotation of the rotor when any other than said predetermined ratio exists, and a regulatable valve in the rotor cooperating with the piston to control the rate of displacement of the fluid medium from one side of the piston to the other as the piston is reciprocated; whereby the rate of reciprocation of the piston may be regulated to selectively establish other than said predetermined ratio.

3. In a variable speed transmission in combination, a hollow fluid tight driving member, a hollow fluid tight driven member mounted within the driving member axially thereof for relative rotation with respect thereto, an annular piston mounted within the driven member for axial reciprocable movement with its outer peripheral portion engaging the interior wall of the driven member in fluid sealed relation, means within the driving member defining an endless cam groove undulating axially of the driving and driven members, radial trunnions on said piston protruding through the hollow driven member for axial movement of the driven member only and operatively engaging said undulating cam groove, a valve cage having a ported portion secured within the driven member and engaging the inner peripheral portion of the piston in fluid sealed relation to form a passage from one side of the piston to the other through said ported portion, and a movable valve in the driven member operable to vary the effective opening of said valve cage ported portion.

4. In a variable speed transmission in combination, a hollow fluid tight driving member provided with a pair of axially spaced bearings, means secured within the driving member having adjacent opposed parallel portions with adjacent opposed portions inclined equally and oppositely of the axis of the driving member to define an endless cam groove, a hollow driven member having an annular wall portion parallel with its axis journaled within the driving member in said bearings, said driven member being formed to provide a plurality of equi-circumferentially spaced axially elongated openings in the annular wall portion thereof, an annular piston mounted within the driven member for reciprocation axially thereof and having its outer peripheral portion engaging the interior of said annular wall portion in fluid sealed relation, a plurality of radial trunnions on the piston protruding one through each of said elongated openings and operatively engaged in said cam groove, means forming a fluid sealed passage for the trunnions through said openings, a valve cage having a ported portion secured within the driven member and engaging the inner peripheral portion of the piston to form a passage from one side of the piston to the other through said ported portion, and a movable valve in the driven member operable to close the passage through said ported portion.

5. The structure of claim 4 wherein the valve cage comprises an annular imperforate portion cooperating with the inner peripheral portion of the piston joined to an annular base, secured to the driven member axially thereof, by circumferentially spaced struts to form said ported portion.

6. The structure of claim 4 wherein the valve cage comprises an annular imperforate portion cooperating with the inner peripheral portion of the piston joined to an annular base, secured to the driven member axially thereof, by circumferentially spaced struts to form said ported portion and the valve comprises an annular member reciprocable within the cage between positions of port covering and uncovering relation.

7. The structure of claim 4 wherein said driven member is journaled in one of said bearings by a hollow shaft secured to the driven member, a sleeve is secured to the driven member axially thereof, a tubular member is secured to the valve and slidable within the sleeve, a valve shaft is slidably mounted in said hollow shaft and secured to the tubular member on the valve and a perforated slidable safety valve is mounted on the valve shaft and engageable with the end of the tubular member within the sleeve in sealed relation, said safety valve being of smaller diameter than the interior of the sleeve.

8. In a variable speed transmission, a hollow driven member mounted for rotative movement and adapted to be filled with a fluid medium, a driving member mounted for movement relative to the driven member, a piston provided with a bore centrally thereof reciprocally mounted within the hollow driven member, means restraining the piston and hollow driven member against relative rotary movement, means forming substantially a fluid seal between the peripheral portion of the piston and adjacent walls of the hollow driven member, means interconnecting the piston and driving member adapted to reciprocate the piston upon relative movement of the driving and driven members, a valve assembly mounted in the rotor in coacting relation with said bore in the piston for controlling passage of fluid from one side of the piston to the other upon reciprocation of the piston; whereby relative movement between said driving and driven members may be varied from zero to the speed of the driving member.

9. In a variable speed mechanism, a driven member mounted for rotative movement, a driving member mounted for movement relative to the driven member, a piston provided with a bore therein mounted on the driven member for relative reciprocal movement, means including said driven member forming a fluid chamber on either side of the piston, means restraining the piston and driven member against relative rotary movement, means interconnecting the piston and driving member adapted to reciprocate the piston upon relative movement of the driving and driven members, a valve cage mounted in the bore of said piston and a valve operable exteriorly of the driven member mounted in the valve cage to control communication between said fluid chamber through said bore.

10. In a variable speed transmission, a hollow driving member provided with a circumferentially extending cam track, a driven member including a hollow casing rotatably mounted within the driving member, an annular piston in said casing shiftable therein longitudinally of the axis of the driven member and provided with means engaging the cam track for imparting reciprocating movement to the piston during rotation of the driving member, an annular valve cage in the casing cooperating with the piston to form front and rear chambers in the casing communicating with each other through side ports formed in the cage at one side of the piston, a valve in said cage, means for shifting the valve into and out of closing relation to the ports to control flow of fluid through the cage and regulate rotation of the driven member during rotation of the driving member and reciprocation of the piston, and means for checking too rapid movement of the valve in a direction to close the ports.

11. In a variable speed transmission, a hollow driving member provided with a circumferentially extending cam track, a driven member including a hollow casing rotatably mounted within the driving member, an annular piston in said casing shiftable therein longitudinally of the axis of the driven member and provided with means engaging the cam track for imparting reciprocating movement to the piston during rotation of the driving member, an annular valve cage rigidly mounted in the casing concentric to the casing and passing through the piston and cooperating therewith to divide the casing into front and rear chambers at opposite sides of the piston, said cage having side ports at one side of the piston for establishing communication between the chambers, a sleeve valve in said cage, means for shifting the valve longitudinally of the cage and progressively moving the valve into and out of closing relation to the ports to regulate flow of fluid through the ports and consequently turning of the driven member with the driving member, and a dash-pot for checking too rapid movement of the valve in a closing direction.

12. In a variable speed transmission, a hollow driving member provided with a circumferentially extending cam track, a driven member including a hollow casing rotatably mounted within the driving member, an annular piston in said casing shiftable therein longitudinally of the axis of the driven member and provided with means engaging the cam track for imparting reciprocating movement to the piston during rotation of the driving member, an annular valve cage rigidly mounted in the casing concentric to the casing and constituting an annular mounting for the piston passing through the piston and cooperating therewith to divide the casing into front and rear chambers at opposite sides of the piston, said cage having side ports at one side of the piston for establishing communication between the chambers, a sleeve valve in said cage, a rod for shifting the valve longitudinally in the cage and progressively moving the valve into and out of closing relation to the side ports of the cage, and cooperating members carried by the valve and the rod and forming a dash-pot for resisting too rapid movement of the valve in a closing direction.

13. In a variable speed transmission, a hollow driving member provided with a circumferentially extending cam track, a driven member including a hollow casing rotatably mounted within the driving member, an annular piston in said casing shiftable therein longitudinally of the axis of the driven member and provided with means engaging the cam track for imparting reciprocating movement to the piston during rotation of the driving member, an annular valve cage rigidly mounted in the casing concentric to the casing and constituting an annular mounting for the piston passing through the piston and cooperating therewith to divide the casing into front and rear chambers at opposite sides of the piston, said cage having side ports at one side of the piston for establishing communication between the chambers, and an annular valve in said cage movable longitudinally therein for progressively closing the side ports and causing rotation of the driven member with the driving member at gradually increasing speed ratios.

14. In a variable speed transmission, a hollow driving member provided with a circumferentially extending cam track, a driven member including a hollow casing rotatably mounted within the driving member, an annular piston in said casing shiftable therein longitudinally of the axis of the driven member and provided with means engaging the cam track for imparting reciprocating movement to the piston during rotation of the driving member, an annular valve cage rigidly mounted in the casing concentric to the casing and constituting an annular mounting for the piston passing through the piston and cooperating therewith to divide the casing into front and rear chambers at opposite sides of the piston, said cage having side ports at one side of the piston for establishing communication between the chambers, a sleeve valve in said cage, a rod for shifting the valve longitudinally in the cage and progressively moving the valve into and out of closing relation to the side ports of the cage, a sleeve carried by and extending longitudinally through said valve concentric thereto, an actuating rod for said valve slidable longitudinally for shifting the valve through the cage and progressively moving the valve across the parts and closing the ports to cause rotation of the driven member with the driving member at gradually increasing speed ratios, and a perforated disc valve carried by said rod and slidable thereon into and out of closing engagement with an adjacent end of said sleeve, the sleeve and disc valve operating with each other to form a dash-pot for checking too rapid movement of the sleeve valve in a closing direction.

FRANKLIN E. STAATS.